United States Patent [19]

Ichikawa et al.

[11] Patent Number: 4,838,649

[45] Date of Patent: Jun. 13, 1989

[54] APPARATUS FOR DRIVING OBJECTIVE LENS

[75] Inventors: Atsushi Ichikawa; Masamichi Ito, both of Ibaraki; Akira Saito, Odawara, all of Japan

[73] Assignee: Hitachi, Ltd., Tokyo, Japan

[21] Appl. No.: 128,578

[22] Filed: Dec. 4, 1987

[30] Foreign Application Priority Data

Dec. 12, 1986 [JP] Japan .................. 61-296027

[51] Int. Cl.$^4$ .............. G02B 7/04; G11B 7/08
[52] U.S. Cl. .................. 350/247; 350/255; 369/44; 369/45
[58] Field of Search ............ 350/247, 255; 369/44–45

[56] References Cited

U.S. PATENT DOCUMENTS

| | | | |
|---|---|---|---|
| 4,385,373 | 5/1983 | Howe | 369/44 |
| 4,566,089 | 1/1986 | Kime | 369/45 |
| 4,653,856 | 3/1987 | Kamiko | 350/255 |
| 4,679,903 | 7/1987 | Kasahara et al. | 350/255 |

FOREIGN PATENT DOCUMENTS

| | | | |
|---|---|---|---|
| 133529 | 8/1982 | Japan | 369/44 |
| 205834 | 12/1982 | Japan | 369/45 |
| 1837 | 1/1983 | Japan | 369/44 |
| 60-182028 | 2/1984 | Japan | |
| 59-194126 | 11/1984 | Japan | |

Primary Examiner—Bruce Y. Arnold
Assistant Examiner—Martin Lerner
Attorney, Agent, or Firm—Antonelli, Terry & Wands

[57] ABSTRACT

A slide shaft is provided upright on a support portion, and a lens support is provided on the slide shaft in such a manner that it can rotate around the slide shaft and slide in the axial direction of the slide shaft. Therefore, a hole having a larger diameter than that of the slide shaft is formed at the center of the lens support. An objective lens is provided at one end of the lens support. A drive portion comprises permanent magnets provided on the support portion and coils for rotation and sliding which are provided on the lens support, and the rotation and movement in the sliding direction are performed by passing currents through the coils. The lens support is supported by a support spring which has high rigidity to the translation in the tracking direction and low rigidity to the rotation in a plane intersecting the slide shaft at right angles.

8 Claims, 3 Drawing Sheets

APPARATUS FOR DRIVING OBJECTIVE LENS

BACKGROUND OF THE INVENTION

1. Field of the Invention

The present invention relates to an apparatus for driving the objective lens of an optical disk device, and particularly to an apparatus for driving an objective lens which is suitable for the two-dimensional drive of such an objective lens.

2. Prior Art

An objective lens is fixed at one end of a support which supports the lens. A through hole is formed at the center of the lens support. A shaft is vertically provided on a base and engaged in the through hole of the lens support. The diameter of the through hole is greater than that of the shaft and thus the lens support is slidable along the shaft and rotatable around the shaft. Therefore, the objective lens provided at one end of the lens support is rotatable around the slidable shaft and movable in the direction of the slidable shaft. The objective lens is moved in the axial direction for the purpose of focusing the light applied on the surface of an optical disk. The objective lens is also rotated around the shaft for the purpose of tracking so that a light spot is positioned in each track of the optical disk. The lens support is moved in the axial direction and rotated around the shaft by employing the functions of the magnetic field produced by a permanent magnet which is provided on the base side and the magnetic field produced by charging electricity into a coil which is provided on the drive side (lens support side). Such apparatus for driving objective lenses are disclosed in Japanese Patent Laid-Open No. 182028/1985 and Japanese Utility Model Laid-Open No. 194126/1984.

In the above-described conventional apparatus, since the lens support is movably engaged with the slide shaft, there is a space between the lens support and the slide shaft. This apparatus therefore has a problem in that, when external acceleration in the direction of tracking (rotation direction) is applied to the apparatus for driving an objective lens, the lens support is moved in the tracking direction and a light spot is also moved following this.

In order to realize high-precision tracking positioning, conventional optical disk devices utilize two-stage servo-tracking. In other words, a light spot having a low frequency and a large amplitude is moved by moving the whole of an optical head, and a light spot having a high frequency and a small amplitude is moved by moving the objective lens alone in the apparatus for driving the objective lens.

In order to realize this two-stage servo-tracking in the apparatus for driving the objective lens without using any sensor for detecting the relative position between the objective lens and the optical head, it is necessary to move the whole of the optical head and the light spot independently by solely utilizing the apparatus for driving the objective lens. Although this condition can be achieved by detecting the relative position between the optical head and the objective lens, there has been a problem with respect to the necessarily complicated structure of the optical head or the apparatus for driving the objective lens, which leads to a high cost.

SUMMARY OF THE INVENTION

It is an object of the present invention to provide an apparatus for driving an objective lens which does not allow a light spot to move relative to an optical head even if acceleration is applied to the optical head during the movement in the tracking direction.

It is another object of the present invention to provide an apparatus for driving an objective lens which can perform driving it with a simple structure and high precision.

An apparatus for driving an objective lens to which the present invention is applied is characterized by comprising a support portion in which a slide shaft is integrally formed; a lens support in which the slide shaft is engaged at the center and which rotates around the slide shaft and moves linearly in the axial direction of the slidable shaft; an objective lens which is fixed on the lens support; a movable portion which contains the lens support and has a composite center of gravity at a position on the axis of the slidable shaft; a drive portion which moves the movable portion in the axial direction of the slide shaft so as to focus light and rotates it around the slide shaft so as to move it in the tracking direction; and a support spring which supports the lens support in a plane containing the slidable shaft in the tracking direction and which has high-rigidity to the translation in the tracking direction and low rigidity to the rotation in a plane intersecting the slide shaft at right angles.

Other objects and characteristics of the present invention will become apparent on reading the following description.

BRIEF DESCRIPTION OF THE DRAWINGS

FIG. 1 is a schematic longitudinal section of an apparatus for driving an objective lens, excluding the magnetic circuit unit;

FIG. 2 is a plan view as viewed in the direction shown by arrows II—II in FIG. 1;

FIG. 3 is a side view as viewed in the direction shown by arrows III—III in FIG. 1;

FIG. 4 is a perspective view of a movable portion;

FIG. 5 is a perspective view of a support portion and a drive portion;

FIG. 6 is a perspective view of an optical head on which the apparatus for driving an objective lens is mounted; and FIG. 7 is an explanatory view of a light spot when an image side principal point is provided on the pitching axis of the objective lens.

DETAILED DESCRIPTION OF EMBODIMENT

Figure 1:
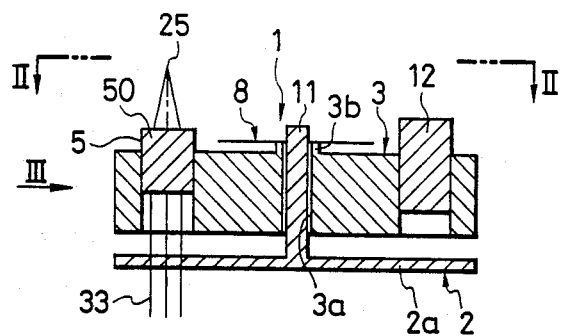
FIGS. 1 to 7 concern an embodiment of the present invention.

The present invention is described below with reference to the embodiment shown in FIGS. 1 to 7.

In FIGS. 1 to 5, an apparatus for driving an objective lens is provided with a base 2 which serves as a support portion, a lens support 3, an objective lens 5, four magnetic circuits 6A, 6B, 6C, 6D which serve as a drive portion, and a support spring 8.

The base 2 comprises a horizontal portion 2a and vertical portions 2b which stand erect at front and rear ends of the horizontal portion 2a, and a slide shaft 11 which stands erect is integrally formed at the center of the horizontal portion 2a. The lens support 3 is formed in a square prism in which the slide shaft 11 is movably engaged in a hole 3a formed at its center. The objective lens 5 is fixed on the left side of the lens support 3 in such a manner that an upper surface projects therefrom. A balancer 12 is fixed on the right side of the lens support 3 in such a manner that an upper surface projects therefrom and establishes a composite center of gravity of a movable portion comprising the lens support 3, the objective lens 5, axially driving coils 15A and 15B described below and rotative coils 16A and 16B so that it is placed on the axis of the slide shaft 11.

The axially driving coils 15A, 15B are respectively fixed on the front and rear ends of the lens support 3, and the rotative coils 16A, 16B are respectively fixed on the left and right ends of the lens support 3. Magnetic substances 18A, 18B are respectively fixed upright on the inside of the erect portions 2b, 2b at the front and rear ends of the horizontal portion 2a of the base 2. Axially driving magnets 19A, 19B are fixed on the insides of upper portions of the magnetic substances 18A, 18B, respectively, and axially driving magnets 19C, 19D are fixed on the insides of lower portions of the magnetic substances 18A, 18B, respectively.

Magnetic substances 20A, 20B are fixed upright in the vicinities of the left and right ends of the horizontal portion of 2a of the base 2, and rotative magnets 22A, 22B are fixed on the insides of front portions of the magnetic substances 20A, 20B, rotative magnets 22C, 22D are fixed on the insides of rear portions of the magnetic substances 20A, 20B, respectively. The movable portion 13 is disposed at certain distances from the axially driving magnets 19A, 19B, 19C, 19D and the rotative magnets 22A, 22B, 22C, 22D so that it can be rotated around the slide shaft 11.

Figure 4:
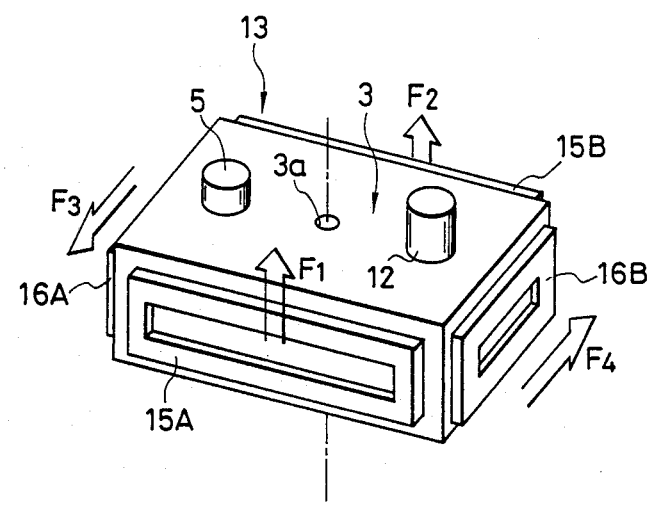
Figure 5:
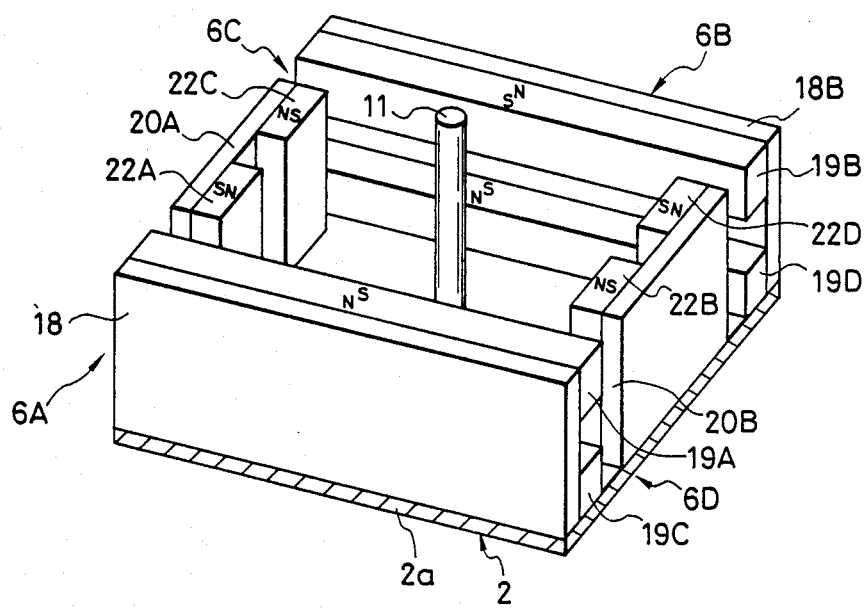

In FIG. 4, the magnetic circuit 6A which generates force $F_1$ comprises the axially driving coil 15A, the axially driving magnets 19A, 19C and the magnetic substance 18A, and the magnetic circuit 6B which generates force $F_2$ comprises the axially driving coil 15B, the axially driving magnets 19B, 19D and the magnetic substance 18B. The currents passing through the axially driving coils 15A, 15B are set so that the directions of the forces $F_1$ and $F_2$ are the same. These forces $F_1$, $F_2$ are controlled by the currents passing through the axially driving coils 15A, 15B, so that the lens support 3 can be moved in the axial direction, i.e. the direction vertical to the surface of FIG. 2, whereby a light spot 25 can be moved in the axial direction of shaft 11.

Figure 2:
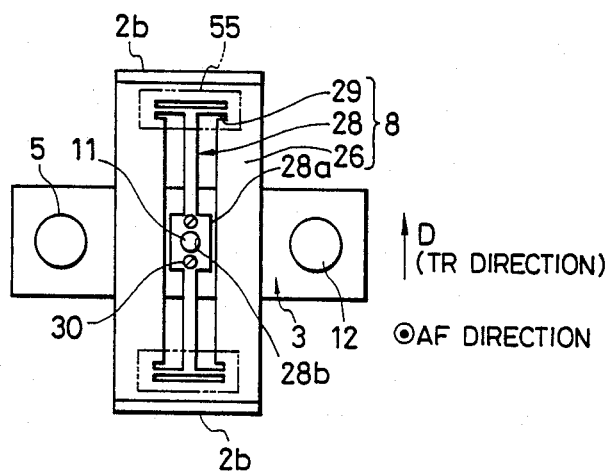
Figure 6:
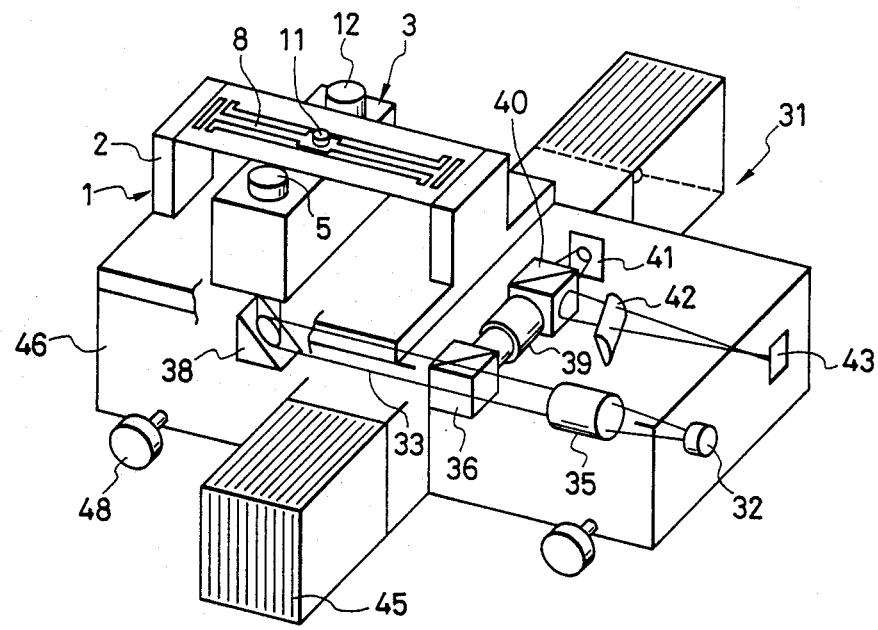

In addition, in FIG. 4, the magnetic circuit 6C which generates force $F_3$ comprises the rotative coil 16A, the rotative magnets 22A, 22C and the magnetic substance 20A, and the magnetic circuit 6D which generates force $F_4$ comprises the rotative coil 16B, the rotative magnets 22B, 22D and the magnetic substance 20B. The currents passing through the rotative coils 16A, 16B are set so that the directions of the forces $F_3$, $F_4$ are the opposite. The couple of forces $F_3$, $F_4$ are controlled by the currents passing through the rotative coils 16A, 16B so that the lens support 3 can be rotated in the direction of an arrow D (rotational direction) shown in FIG. 2, whereby the light spot 25 can be moved in the tracking direction as shown by arrow TR in FIGS. 2, 3 and 7. The support spring 8 is formed by a thin metal plate spring and comprises a peripheral support portion 26, a longitudinal centered portion 28 and lateral frame portions 29. The support portion 26 as shown in FIG.2 is disposed on an intersection of the surface containing the slide shaft 11 (see Fig. 7) in the rotational direction and an image side principal plane 53 shown in FIG. 7 of the objective lens 5 so that the front and rear ends of the support portion 26 are fixed to the erect portions 2b of the base 2 as shown in FIG. 6. The longitudinal central portion 28 is formed along a line which passes through the axis of the slide shaft 11 in the rotational direction (TR direction shown in FIG. 2) by cutting out strips which are parallel to each other and with respect to the axis from the center of the support portion 26. A hole 28b of a mounting portion 28a which is formed at the center of the longitudinal central portion is engaged with the slide shaft 11 so that the central portion 28 is fixed on a convex portion 3b which is formed at the center of the upper surface of the lens support 3 by means of mounting screws 30. In other words, the connection between the lens support 3 and the support spring 8 is placed in on the image side of the principal plane 53 of the objective lens 5 (see FIG. 7). The lateral frame portions 29 are formed by cutting out strips which cross the longitudinal central portion 28 at right angles from the peripheral support portion 26 at the front and rear ends of the frame portion 28.

A description will now be made of the function of the embodiment of the present invention.

FIG. 6 shows the state wherein the apparatus 1 for driving the objective lens of the present invention is mounted on an optical head 31. In this drawing, laser beams 33 generated from a semiconductor laser 32 are made parallel by a collimator lens 35, pass through a beam splitter 36, are oriented to the vertical direction by a rising mirror 38, and enters the objective lens 5. The light reflected on an optical disk data surface (not shown) is again reflected on the rising mirror 38 and on the beam splitter 36 and enter a detection optical system comprising a spherical lens 39, a beam splitter 40, a tracking photosensor 41, a cylindrical lens 42 and a focusing photosensor 43.

The detection optical system serves to detect deviation of the focal point of the light spot incident upon the optical disk data surface and deviation of the track from a data track, and to feed back the light to a control circuit (not shown). In the control circuit, the apparatus 1 for driving the objective lens is driven by passing currents through the axial driving coils 15 and the rotative coil 16 so that the focal and track deviations are decreased. At the same time, the whole of the optical head 31 is driven by passing a current through an optical head-moving coil 45 by processing a current passed through the rotative coil 16 by way of an electrical circuit so that the low-frequency component of a signal of the tracking deviation is decreased. The optical head 31 shown in FIG. 6 is able to stably perform the above-described two-stage servo-tracking with high accuracy.

The optical head 31 is guided in the rotational direction by a plurality of ball bearings provided on a head body 46 and a guide portion (not shown). There are many configurations of the detection optical system other than that shown in FIG. 6, from which a suitable system is selected in accordance with the intended use of the optical head 31.

Figure 7:
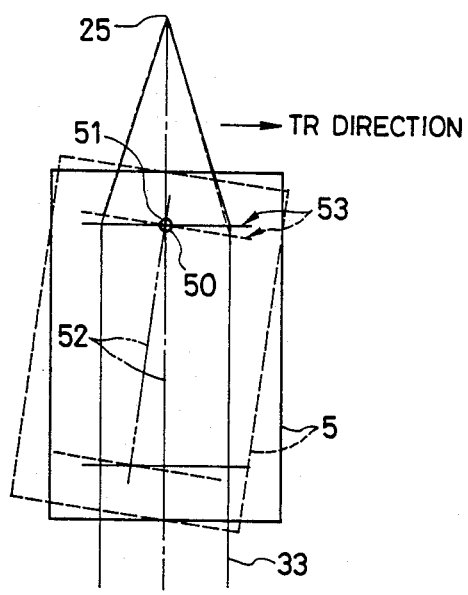

FIG. 7 shows the position of the light spot 25 when an image side principal point 50 is provided on a pitching axis 51 of the objective lens 5. The laser beams 33 passing through the image side principal plane (plane at right angles with an optical axis 52 containing the image side principal point 50) are focused at the point 25 which is placed at a distance of a focal length from the image side principal point 50.

The lens support 3 is supported by the support spring 8 having high rigidity for the translation in the tracking direction and located on the image side of the principal plane 53. Therefore, if the lens support 3 is rotated around the pitching axis 51 within the range of a play by the acceleration generated when the optical head 31 is moved in the tracking direction, as shown by dotted lines in FIGS. 3, and 7 and the objective lens 5 is inclined so that the laser beams 33 enter with deviation from the optical axis 52, as shown by dotted lines in FIG. 7, since the image side principal point 50 of the objective lens 5 is provided on the pitching axis 51 and is not moved, the position of the light spot 25 is not changed. In addition, since the support spring 8 supports the lens support 3 in the plane containing the slide shaft 11 in the tracking direction the lens support 3 is not moved around the slide shaft 11 by the acceleration in the tracking direction. Such a support spring 8 can control deviation of the relative position of the optical spot 25 relative to the optical head 31 caused by the acceleration in the tracking direction, and thus the optical head 31 and the apparatus 1 for driving the objective lens are given independence with respect to the positioning of the optical spot 25 in the tracking direction.

In the embodiment, although the lower end of the lens support 3 is controlled by the slide shaft 11 and the bearing hole 3a of the lens support 3, a spring member may be provided at the lower end of the lens support 3 so that the movement of the lower end in the plane crossing at right angles with the slidable shaft 11 can be controlled by the spring member.

Figure 3:
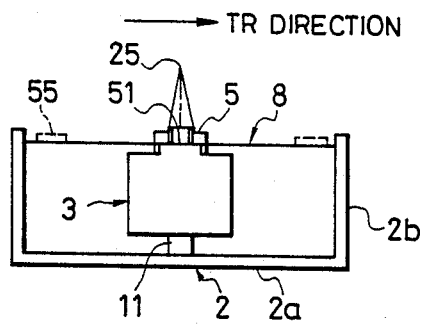

In addition, as shown by broken lines in FIGS. 2 and 3, the connection of a visco-elastic substance 55 such as a rubber with the upper surface of the support spring 8 can control the tracking and axial sliding thereof.

As described above, in accordance with the present invention, the support spring 8, having rigidity to the translation in the tracking direction, supports the lens support to which the objective lens is fixed and the position of the light spot 25 is not moved by an external acceleration tracking positioning can be thus performed with high accuracy by a low-priced apparatus for driving an objective lens.

I claim:

1. An apparatus for driving an objective lens characterized by comprising:
    a slide shaft which is formed on a support portion and has an axis;
    a lens support which is slidable and rotatably provided on said slide shaft;
    an objective lens which is provided at one end of said lens support;
    and a support spring which supports said lens support symmetrically with respect to a plane containing the axis of said slide shaft and parallel to a tracking direction and which has high rigidity to movement in the tracking direction and low rigidity to movement in the sliding direction.

2. An apparatus for driving an objective lens characterized by comprising:
    a support portion in which a slide shaft is integrally formed, said slide shaft having an axis;
    a movable portion comprising an objective lens, a lens support, and a drive portion, the movable portion having a composite center of gravity at a position on the axis of the slide shaft;
    a lens support having a center engaged with said slide shaft and being mounted to rotate about said slide shaft and to move linearly in an axial direction of said slide shaft;
    an objective lens which is fixed on said lens support;
    a drive portion which moves said lens support in the axial direction of said slide shaft so as to focus light and rotates the lens support around said slide shaft so as to move said lens in a tracking direction; and
    a support spring which supports said lens symmetrically with respect to a plane containing the axis of said slide shaft and parallel to the tracking direction and which has high rigidity to translation in the tracking direction and low rigidity with respect to the rotation in a plane intersecting said slide shaft at right angles.

3. An apparatus for driving an objective lens according to claim 2, wherein said lens support and said support spring are connected on an image side of a principal plane of said objective lens.

4. An apparatus for driving an objective lens characterized by comprising a support portion in which a slide shaft is integrally formed, said slide shaft having an axis;
    a movable portion comprising an objective lens, lens support, and a drive portion, the movable portion having a composite center of gravity at a position on the axis of said slide shaft;
    a lens support having a center engaged with said slide shaft and being mounted to rotate about said slide shaft and to move linearly in an axial direction of said slide shaft;
    an objective lens which is fixed on said lens support;
    a drive portion which moves said lens support in the axial direction of said slide shaft so as to focus light and rotates the lens support around said slide shaft so as to move said objective lens in a tracking direction; and
    a support means which supports said lens support and which has high rigidity to translation in the tracking direction and low rigidity with respect to rotation in a plane intersecting said slide shaft at right angles.

5. An apparatus for driving an objective lens according to claim 4, wherein said lens support and said support means are connected on an image side of a principal plane of said objective lens.

6. An apparatus for driving an objective lens characterized by comprising:
    a slide shaft which is formed on a support portion and has an axis;
    a lens support which is slidable and rotatably provided on said slide shaft;
    an objective lens which is provided at one end of said lens support; and
    a support spring of rigid material which supports said lens support symmetrically with respect to a plane containing the axis of said slide shaft and parallel to a tracking direction, said support spring having a part, the width of which is much narrower than its length along a straight axis with move than half of said spring length lying in the direction of said support spring axis and being parallel to said plane, said spring axis being close to said plane and an inner end of said support spring being close to said slide shaft.

7. An apparatus for driving an objective lens characterized by comprising:
    a support portion in which a slide shaft is integrally formed, said slide shaft having an axis;

a movable portion comprising an objective lens, a lens support, and a drive portion, the movable portion having a composite center of gravity at a position on the axis of the slide shaft:

a lens support having a center engaged with said slide shaft and being mounted to rotate about said slide shaft and to move linearly in an axial direction of said slide shaft;

an objective lens which is fixed on said lens support;

a drive portion which moves said lens support in the axial direction of said slide shaft so as to focus light and rotates the lens support around said slide shaft so as to move said lens in a tracking direction; and a support spring which supports said movable portion symmetrically with respect to a plane containing the axis of said slide shaft and parallel to the tracking direction, said support spring having:

(1) a major axis crossing the slide shaft axis in a tracking direction and being made straight and slender of a rigid but deformable material;

(2) more than half of a length in the direction said major axis of said support spring being parallel to said plane;

(3) said major axis being on or close to said plane; and (4) an inner end that is close to said slide shaft.

8. An apparatus for driving an objective lens characterized by comprising:

a support portion in which a shaft is integrally formed, said slide shaft having an axis;

a movable portion comprising an objective lens, lens support, and a drive portion, the movable portion having a composite center of gravity at a position on the axis of said slide shaft;

a lens support having a center engaged with said slide shaft and being mounted to rotate about said slide shaft and to move linearly in an axial direction of said slide shaft.

an objective lens which is fixed on said lens support;

a drive portion which moves said lens support in the axial direction of said slide shaft so as to focus light and rotates the lens support around said slide shaft so as to move said objective lens in a tracking direction; and a support means which supports said lens support and which contains at least two deformable straight parts having axes which are disposed along a plane containing said slide shaft in said tracking direction symmetrically with respect to said slide shaft with inner ends of said straight parts being close to said slide shaft.

* * * * *